(12) United States Patent
Enokihara et al.

(10) Patent No.: US 12,013,981 B2
(45) Date of Patent: Jun. 18, 2024

(54) VIBRATION DEVICE, INFORMATION PROCESSING APPARATUS, AND VIBRATION CONTROL SYSTEM

(71) Applicant: SONY INTERACTIVE ENTERTAINMENT INC., Tokyo (JP)

(72) Inventors: Takashi Enokihara, Tokyo (JP); Takuro Sawada, Tokyo (JP); Masatoshi Nakae, Tokyo (JP); Shinya Mikami, Tokyo (JP); Kenichi Sato, Tokyo (JP); Yoshiyuki Imada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 181 days.

(21) Appl. No.: 17/613,043

(22) PCT Filed: Jun. 16, 2020

(86) PCT No.: PCT/JP2020/023591
§ 371 (c)(1),
(2) Date: Nov. 20, 2021

(87) PCT Pub. No.: WO2020/255960
PCT Pub. Date: Dec. 24, 2020

(65) Prior Publication Data
US 2022/0253141 A1 Aug. 11, 2022

(30) Foreign Application Priority Data
Jun. 21, 2019 (JP) .................. 2019-115510

(51) Int. Cl.
*G06F 3/01* (2006.01)
*A63F 13/285* (2014.01)
*G06F 3/038* (2013.01)

(52) U.S. Cl.
CPC ............ *G06F 3/016* (2013.01); *A63F 13/285* (2014.09); *G06F 3/038* (2013.01)

(58) Field of Classification Search
CPC ........ G06F 3/016; G06F 3/038; A63F 13/285; A63F 13/23
See application file for complete search history.

(56) References Cited

U.S. PATENT DOCUMENTS 7,052,397 B2 * 5/2006 Kikukawa ............... G06F 3/016
463/43
2016/0258758 A1 * 9/2016 Houston ................ G01D 5/145
(Continued)

FOREIGN PATENT DOCUMENTS

EP 0940162 A1 * 9/1999
EP 0940162 A1 9/1999
(Continued)

OTHER PUBLICATIONS

International Search Report and Written Opinion mailed Aug. 4, 2020, from PCT/JP2020/023591, 8 sheets.
(Continued)

*Primary Examiner* — Ricardo Osorio
(74) *Attorney, Agent, or Firm* — XSENSUS LLP (57) ABSTRACT

Provided is a vibration device that is connected to an information processing apparatus and includes a vibration mechanism that generates a vibration. The vibration device receives a first vibration command for the vibration device from the information processing apparatus, receives a second vibration command for a different type of vibration device from the information processing apparatus in parallel with the first vibration command, and operates the vibration mechanism on the basis of at least one of the first vibration command and the second vibration command. The second vibration command is in a format different from that of the
(Continued)

first vibration command. The different type of vibration device is of a type different from that of the vibration device.

10 Claims, 3 Drawing Sheets

(56) References Cited

U.S. PATENT DOCUMENTS

| | | | |
|---|---|---|---|
| 2018/0193738 A1* | 7/2018 | Yamashita | A63F 13/235 |
| 2020/0061460 A1* | 2/2020 | Nakagawa | A63F 13/215 |
| 2022/0094253 A1* | 3/2022 | Houston | H02K 7/003 |

FOREIGN PATENT DOCUMENTS

| | | | | |
|---|---|---|---|---|
| EP | 3275517 A1 | 1/2018 | | |
| EP | 3348312 A1 * | 7/2018 | | A63F 13/235 |
| EP | 3348312 A1 | 7/2018 | | |
| JP | 2007075419 A | 3/2007 | | |
| JP | 2007195588 A | 8/2007 | | |
| JP | 2010041678 A | 2/2010 | | |
| WO | 2016136934 A1 | 9/2016 | | |
| WO | WO-2018110435 A1 * | 6/2018 | | G06F 3/01 |
| WO | WO-2018193557 A1 * | 10/2018 | | A63F 13/215 |

OTHER PUBLICATIONS

The extended European Search Report dated May 22, 2023, from European Patent Application No. 20827194.0, 9 sheets.

* cited by examiner

VIBRATION DEVICE, INFORMATION PROCESSING APPARATUS, AND VIBRATION CONTROL SYSTEM

TECHNICAL FIELD

The present invention relates to a vibration device, an information processing apparatus, a vibration control system, an information processing method, and a program that are configured to present a vibration to a user.

BACKGROUND ART

A vibration device for presenting a vibration to a user is occasionally connected to an information processing apparatus, such as a home video game console, in order to notify the user of the occurrence of an event or enhance the sense of presence, for instance, in a game.

SUMMARY

Technical Problem

In conjunction with the above technology, there may be a case where a new vibration device operating in a manner different from that of a conventional vibration device may be provided. If an attempt is made, in this case, to use an information processing apparatus and a program designed on the assumption that the conventional vibration device is connected, the new vibration device may not be connectable to the information processing apparatus and the program. In order to avoid such a problem, the new vibration device may be provided with a function for receiving a vibration command for the conventional vibration device, to provide compatibility with the conventional vibration device. However, sufficient studies have not been conducted to determine how to receive and process two different types of vibration commands, one for the conventional vibration device and the other for the new vibration device.

The present invention has been made in view of the above circumstances. An object of the present invention is to provide a vibration device, an information processing apparatus, a vibration control system, an information processing method, and a program that are able to effectively ensure compatibility with a different type of vibration device.

Solution to Problem

According to an aspect of the present invention, there is provided a vibration device that is connected to an information processing apparatus. The vibration device includes a vibration mechanism that generates a vibration, a first reception section that receives a first vibration command for the vibration device from the information processing apparatus, a second reception section that receives, from the information processing apparatus, a second vibration command for a different type of vibration device in parallel with the first vibration command, the second vibration command being in a format different from that of the first vibration command, the different type of vibration device being of a type different from that of the vibration device, and a vibration control section that operates the vibration mechanism on the basis of at least one of the first vibration command and the second vibration command.

According to another aspect of the present invention, there is provided an information processing apparatus that is connected to a vibration device. The information processing apparatus includes a first transmission section that transmits a first vibration command for the vibration device to the vibration device, a second transmission section that transmits a second vibration command for a different type of vibration device to the vibration device, the second vibration command being in a format different from that of the first vibration command, the different type of vibration device being a type different from that of the vibration device, and a switching command transmission section that transmits a switching command to the vibration device, the switching command switching between two control commands to be used by the vibration device, namely, between the first vibration command and the second vibration command.

According to yet another aspect of the present invention, there is provided a vibration control system including an information processing apparatus and a vibration device. The information processing apparatus and the vibration device are connected to each other. The information processing apparatus includes a first transmission section that transmits a first vibration command for the vibration device to the vibration device, a second transmission section that transmits a second vibration command for a different type of vibration device to the vibration device, the second vibration command being in a format different from that of the first vibration command, the different type of vibration device being of a type different from that of the vibration device, and a switching command transmission section that transmits a switching command to the vibration device, the switching command switching between two control commands to be used by the vibration device, namely, between the first vibration command and the second vibration command. The vibration device includes a vibration mechanism that generates a vibration, a first reception section that receives the first vibration command from the information processing apparatus, a second reception section that receives the second vibration command from the information processing apparatus in parallel with the first vibration command, and a vibration control section that operates the vibration mechanism on the basis of the first vibration command or the second vibration command, whichever is determined based on the switching command received from the information processing apparatus.

According to still another aspect of the present invention, there is provided an information processing method that is executed by a computer connected to a vibration device. The information processing method includes the steps of transmitting a first vibration command for the vibration device to the vibration device, transmitting a second vibration command for a different type of vibration device to the vibration device, the second vibration command being in a format different from that of the first vibration command, the different type of vibration device being of a type different from that of the vibration device, and transmitting a switching command to the vibration device, the switching command switching between two control commands to be used by the vibration device, namely, between the first vibration command and the second vibration command.

According to an additional aspect of the present invention, there is provided a program for causing a computer connected to a vibration device to execute the steps of transmitting a first vibration command for the vibration device to the vibration device, transmitting a second vibration command for a different type of vibration device to the vibration device, the second vibration command being in a format different from that of the first vibration command, the different type of vibration device being of a type different from that of the vibration device, and transmitting a switching command to the vibration device, the switching command switching between two control commands to be used by the vibration device, namely, between the first vibration command and the second vibration command. The program may be stored and supplied on a non-transitory, computer-readable information storage medium.

DESCRIPTION OF EMBODIMENT

An embodiment of the present invention will now be described with reference to the accompanying drawings.

A vibration control system 1 according to the embodiment of the present invention includes an information processing apparatus 10 and a vibration device 20.

Figure 1:
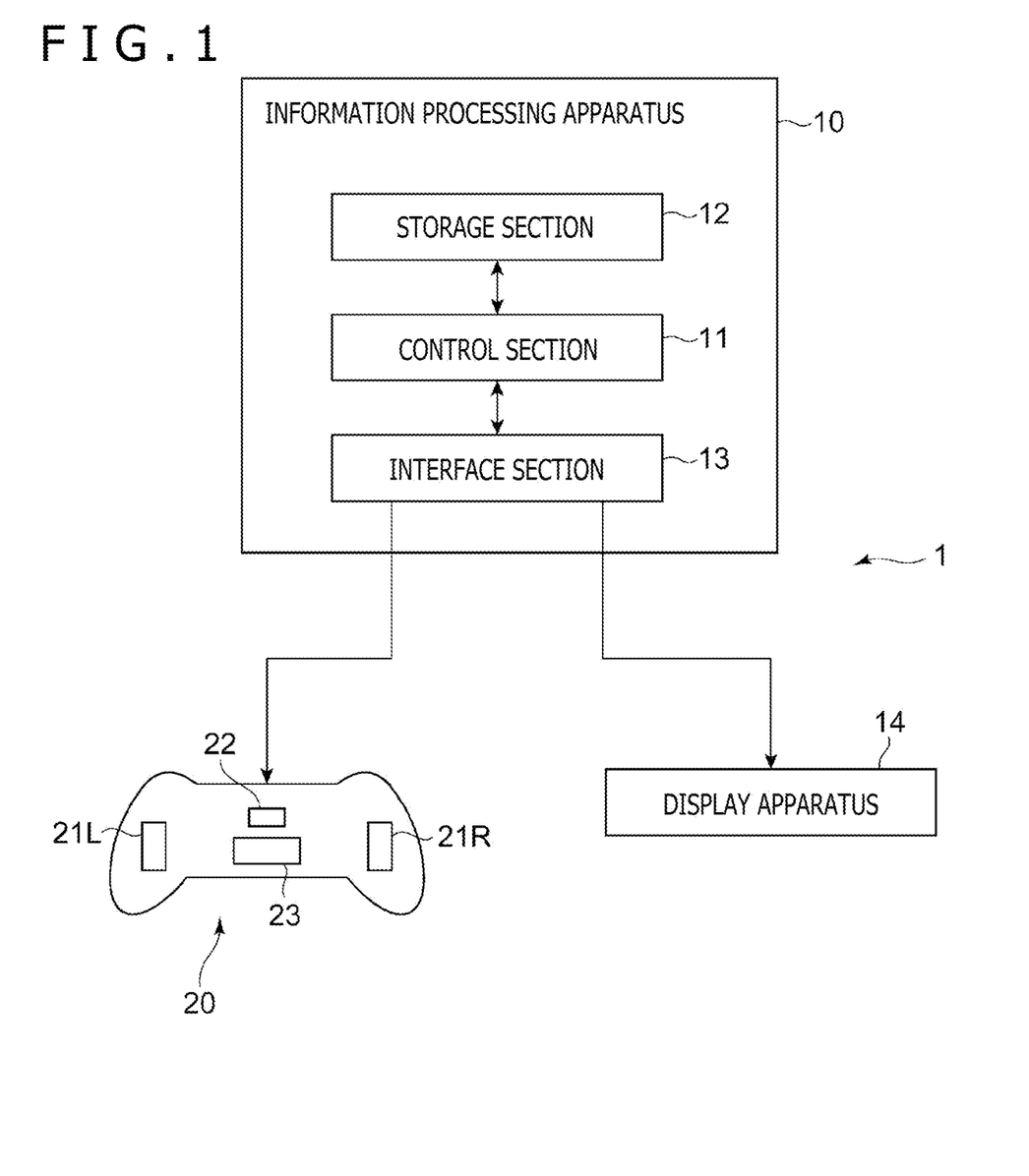
FIG. 1 is a block diagram illustrating a configuration example of a vibration control system according to an embodiment of the present invention.

The information processing apparatus 10, which is, for example, a home video game console or a personal computer, includes a control section 11, a storage section 12, and an interface section 13 as depicted in FIG. 1. Further, the information processing apparatus 10 is connected to a display apparatus 14 and to the vibration device 20.

The control section 11 includes a program control device, such as a central processing unit (CPU), and performs various information processing tasks, according to a program stored in the storage section 12. The processing performed by the control section 11 will be described in detail later.

The storage section 12, which is, for example, a memory device, stores the program to be executed by the control section 11. The program may be stored and supplied on a non-transitory, computer-readable storage medium and copied to the storage section 12. Further, the storage section 12 also operates as a work memory of the control section 11.

The interface section 13 is an interface for transmitting and receiving data between the display apparatus 14 and the vibration device 20. The interface section 13 may include a wired communication interface, such as a universal serial bus (USB) interface, and a wireless communication interface, such as a Bluetooth (registered trademark).

The display apparatus 14, which is, for example, a liquid-crystal display or an organic electroluminescent (EL) display, receives a video signal from the information processing apparatus 10 through the interface section 13 and displays a video image based on the received video signal on screen.

The vibration device 20 is a device for presenting a user with a vibration based on vibration data received from the information processing apparatus 10. The vibration device 20 includes a vibration mechanism 21, a communication interface 22, and a control circuit 23. Further, the vibration device 20 may include manipulation buttons or other manipulation members for receiving manipulation by a user and may operate as a manipulation device.

The vibration mechanism 21 may be various types of vibration generating mechanisms such as a linear actuator or a voice coil motor, for example. In the present embodiment, it is assumed that the vibration device 20 includes two vibration mechanisms 21L and 21R, which are respectively disposed on the left and right sides of a housing of the vibration device 20. Further, it is assumed in the present embodiment that the vibration mechanism 21 receives a vibration signal representative of a waveform from the control circuit 23 and generates a vibration based on the shape of the waveform. When the vibration mechanism 21 generates a vibration, the vibration is presented to the user gripping the vibration device 20.

The communication interface 22 wirelessly or wiredly transmits and receives data to and from the information processing apparatus 10. The control circuit 23, which is, for example, a microprocessor, receives a vibration command that is transmitted from the information processing apparatus 10 through the communication interface 22 and operates the vibration mechanism 21 according to the received vibration command.

In the present embodiment, the vibration device 20 emulates an operation of a vibration device that is of a type different from that of the vibration device 20. The different type of vibration device targeted for emulation by the vibration device 20 is hereinafter referred to as a conventional vibration device. The conventional vibration device is typically a vibration device of a generation older than that of the vibration device 20, but is not limited to such an older-generation vibration device.

It is assumed that the conventional vibration device includes a vibration mechanism of a type different from that of the vibration mechanism 21 included in the vibration device 20. Therefore, the contents of a vibration command for operating such a different vibration mechanism are different from the contents of a vibration command to be originally received by the vibration device 20. More specifically, it is assumed that the conventional vibration device receives a vibration command including information regarding a numerical value specifying an intensity of vibration at regular time intervals and generates a vibration having an intensity based on the received numerical value for a predetermined period of time. That is, the conventional vibration device is unable to provide desired control over the shape of the waveform of vibration to be generated, but is able to vary the vibration intensity according to the magnitude of the numerical value included in the vibration command and continuously receive the vibration command so as to control the period of time during which the vibration continues. Further, it is assumed that the conventional vibration device is also provided with two vibration mechanisms built therein, as is the case with the vibration device 20, and able to operate the vibration mechanisms independently.

The vibration command received by the conventional vibration device is hereinafter referred to as a non-host model vibration command. As mentioned earlier, the non-host model vibration command includes the numerical value specifying the vibration intensity. Meanwhile, the vibration command to be originally received by the vibration device 20 is referred to as a host model vibration command. The host model vibration command is in a format different from that of the non-host model vibration command and cannot be processed by the conventional vibration device. More specifically, the host model vibration command is for generating a vibration whose contents are determined based on the performance and vibration characteristics of the vibration mechanism 21 and includes vibration waveform data specifying the waveform shape of vibration to be generated by the vibration mechanism 21. The vibration waveform data may be in a format similar to that of audio data. In the present embodiment, it is assumed that the vibration device 20 is configured to be able to receive not only the host model vibration command but also the non-host model vibration command and is able to generate vibrations based on both of these vibration commands.

Figure 2:
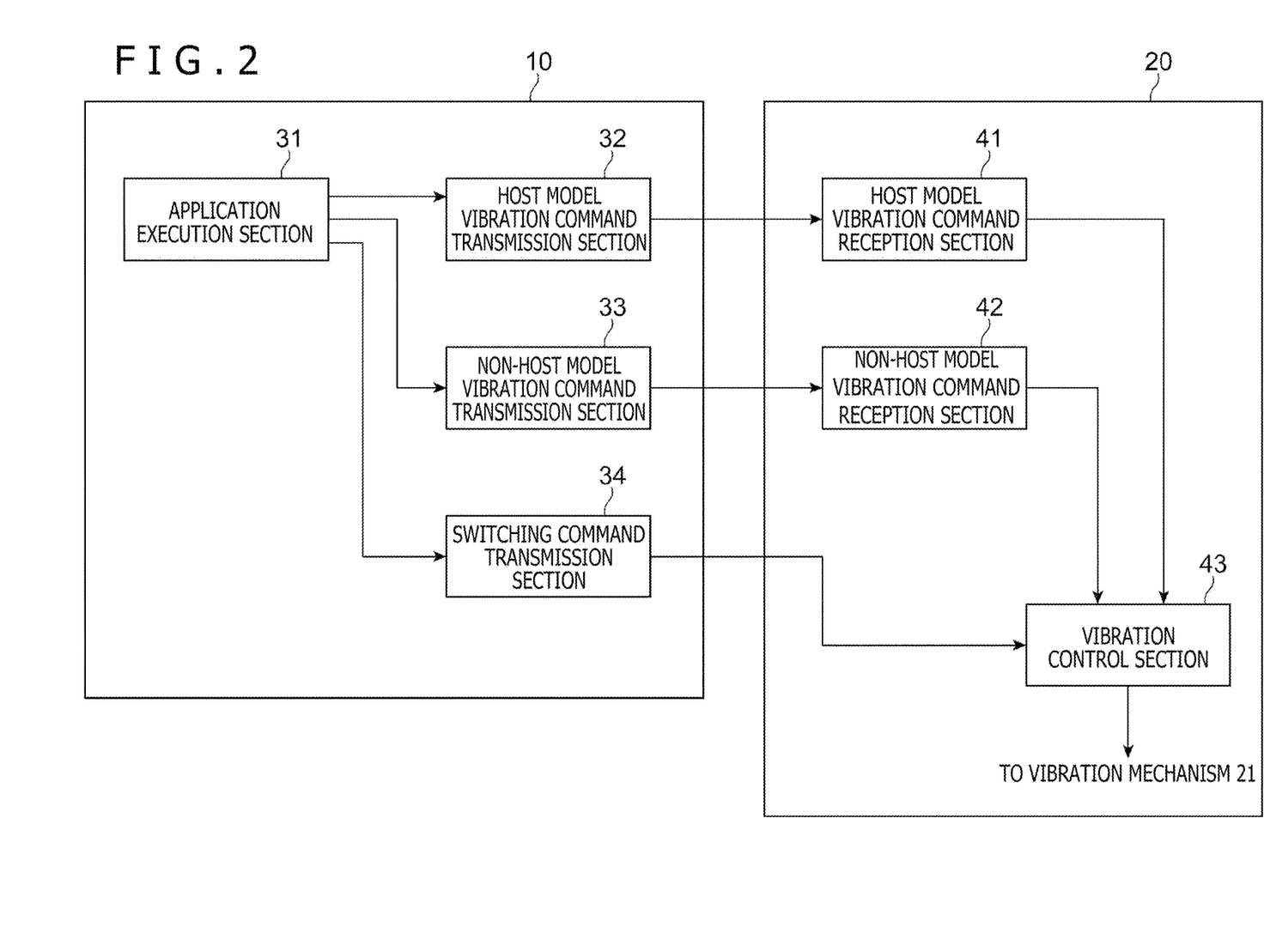
FIG. 2 is a functional block diagram illustrating functions of the vibration control system according to the embodiment of the present invention.

Functions implemented by the vibration control system 1 will now be described with reference to FIG. 2. As depicted in FIG. 2, the information processing apparatus 10 functionally includes an application execution section 31, a host model vibration command transmission section 32, a non-host model vibration command transmission section 33, and a switching command transmission section 34. The functions of these sections are implemented when the control section 11 executes a program stored in the storage section 12. The program may be supplied to the information processing apparatus 10 through a communication network such as the Internet, or stored on a non-transitory, computer-readable information storage medium, such as an optical disc, and supplied to the information processing apparatus 10. Meanwhile, the vibration device 20 functionally includes a host model vibration command reception section 41, a non-host model vibration command reception section 42, and a vibration control section 43. The functions of these sections are implemented when the control circuit 23 executes a program stored in a built-in memory.

The application execution section 31 executes an application program. The application program performs various processing tasks for presenting a vibration to the user, and may be, for example, a game program. The application execution section 31 issues at least one of two different vibration requests, according to the progress of its processing.

The two different vibration requests include a non-host model vibration request and a host model vibration request. The non-host model vibration request is for requesting the conventional vibration device to generate a vibration. The host model vibration request is for requesting the vibration device 20 to generate a vibration. The application execution section 31 issues these vibration requests, for example, by calling an associated application programming interface (API). The application execution section 31 may issue only one of the two different vibration requests or issue the two different vibration requests in parallel. In any case, the application execution section 31 does not need to recognize whether the information processing apparatus 10 is currently connected to the conventional vibration device or the vibration device 20. It is sufficient if the application execution section 31 simply issues a predetermined vibration request.

More specifically, an application program compatible with only the conventional vibration device issues the non-host model vibration. Such an application program may be the one that has been unveiled before the vibration device 20 according to the present embodiment is released as a product. Meanwhile, an application program compatible with the vibration device 20 may issue only the host model vibration request. However, in a case where the information processing apparatus 10 is connected to the conventional vibration device instead of the vibration device 20, the conventional vibration device cannot be vibrated by mere issue of the host model vibration request. Therefore, the application program executed by the application execution section 31 may simultaneously issue the two different vibration requests, namely, the non-host model vibration request and the host model vibration request. In this manner, the vibration device connected to the information processing apparatus 10 can be vibrated irrespective of the type of connected vibration device.

The host model vibration command transmission section 32 outputs the host model vibration command, according to the host model vibration request issued by the application execution section 31, and transmits the host model vibration command to the vibration device connected to the information processing apparatus 10 (the vibration device 20 in this instance).

The non-host model vibration command transmission section 33 outputs the non-host model vibration command, according to the non-host model vibration request issued by the application execution section 31, and transmits the non-host model vibration command to the vibration device connected to the information processing apparatus 10. It should be noted that it suffices for the non-host model vibration command transmission section 33 to output the non-host model vibration command in the same format no matter whether the information processing apparatus 10 is connected to the vibration device 20 or the conventional vibration device.

The switching command transmission section 34 transmits a switching command to the vibration device 20. The switching command is for instructing the vibration device 20 to switch the vibration command to be used for vibration control. The switching command will be described in detail later.

The host model vibration command reception section 41 receives the host model vibration command transmitted from the host model vibration command transmission section 32 of the information processing apparatus 10. The non-host model vibration command reception section 42 receives the non-host model vibration command transmitted from the non-host model vibration command transmission section 33 of the information processing apparatus 10. These vibration command reception sections remain ready to always receive the vibration commands that are transmitted from the information processing apparatus 10 on a regular or irregular basis.

One of the features of the present embodiment is that the host model vibration command reception section 41 and the non-host model vibration command reception section 42 receive the respective types of vibration commands simultaneously in a parallel manner. When control is exercised to cause these reception sections to newly start receiving specific types of vibration commands or stop receiving vibration commands executed thus far, a high processing load is imposed. In some cases, therefore, processing may not be immediately performed to start or stop the reception of vibration commands. In view of such circumstances, the vibration device 20 according to the present embodiment remains ready to always receive both of these vibration commands. Consequently, no matter which of these vibration commands is transmitted from the information processing apparatus 10, the vibration device 20 is able to receive the transmitted vibration command and exercise vibration control based on the contents of the received vibration command without delay.

Based on the vibration command received by the host model vibration command reception section 41 or by the non-host model vibration command reception section 42, the vibration control section 43 exercises vibration control for vibrating the vibration mechanism 21. For example, the vibration control section 43 outputs a control signal for vibrating the vibration mechanism 21, according to one of two types of vibration commands that is selected based on given criteria.

As a specific example, it is assumed that the vibration control section 43 switches between the two types of vibration commands on the basis of the switching command transmitted from the switching command transmission section 34. More specifically, in a case where the switching command received by the vibration control section 43 instructs use of the host model vibration command, the vibration control section 43 subsequently operates the vibration mechanism 21 on the basis of the host model vibration command received by the host model vibration command reception section 41. Conversely, in a case where the switching command received by the vibration control section 43 instructs use of the non-host model vibration command, the vibration control section 43 subsequently operates the vibration mechanism 21 on the basis of the non-host model vibration command received by the non-host model vibration command reception section 42. As mentioned earlier, the two vibration command reception sections receive the respective vibration commands simultaneously in a parallel manner. Therefore, upon receiving the above-described switching command, the vibration control section 43 is able to start exercising vibration generation control based on a vibration command selected after switching, without delay.

In a case where the host model vibration command is used, the vibration control section 43 outputs a control signal that causes the vibration mechanism 21 to generate a vibration based on waveform data specified by the host model vibration command. Further, in a case where the host model vibration command includes an instruction for causing the two vibration mechanisms 21 to respectively generate different vibrations, it is assumed that different control signals are respectively outputted to the vibration mechanisms 21L and 21R, according to the instruction.

Meanwhile, in a case where the non-host model vibration command is used for vibration control, the vibration control section 43 produces waveform data for operating the vibration mechanism 21 on the basis of a specified vibration mechanism 21 for generating a vibration and a specified vibration intensity, which are included in the non-host model vibration command. The vibration control section 43 then outputs a control signal for generating a vibration based on the waveform data to the vibration mechanism 21. This causes the vibration device 20 to emulate a vibration that is presumably generated in a case where the non-host model vibration command is received by the conventional vibration device. It should be noted that emulation control over such a vibration will be described in detail later.

The following describes the switching of the vibration command to be used by the vibration control section 43, which is performed based on the switching command transmitted from the switching command transmission section 34 of the information processing apparatus 10. For example, the switching command transmission section 34 transmits the switching command, according to the type of application program executed by the application execution section 31. More specifically, when the application execution section 31 starts executing an application program newly, the switching command transmission section 34 identifies whether the application program is compatible with the novel vibration device 20 or compatible with only the conventional vibration device. This identification may be executed by referencing information indicative of the type and the version of the application program, which are recorded in the application program. When the result of identification indicates that the application program to be newly executed is compatible with the vibration device 20, the switching command transmission section 34 transmits the switching command for instructing the use of the host model vibration command. Meanwhile, when the application program to be executed is compatible with only the conventional vibration device, the switching command transmission section 34 transmits the switching command for instructing the use of the non-host model vibration command. Based on the received switching command, the vibration control section 43 determines the type of vibration command to be used for actually operating the vibration mechanism 21. This makes it possible to generate a vibration based on the type of vibration request issued by the application program.

In the above example, in a case where a conventional application program is to be executed, it is sufficient if the conventional application program issues the same vibration request as in a case where the conventional vibration device is connected. Therefore, the information processing apparatus 10 enables the vibration device 20 to generate a vibration by using the application program compatible with only the conventional vibration device without making any changes.

Further, in the above example, in a case where the application execution section 31 switches to and executes another application program, according to task switching based, for example, on an instruction from the user, the type of application program selected upon switching may be identified to transmit the switching command based on the result of identification. Consequently, even in a case where the currently executed application program is changed to another application program in the middle of execution, vibration control can always be exercised by using a vibration command compatible with the currently executed application program.

Moreover, the switching command transmission section 34 may transmit the switching command, according to a request from the application program. In this example, in association with the execution of application program processing and before the issue of the vibration request, the application execution section 31 pre-issues a switching request for specifying the type of vibration request to be issued. The switching command transmission section 34 transmits the switching command for instructing use of the type of vibration command that is specified by the switching request. This enables the application program to cause the vibration device 20 to generate a vibration by selectively issuing an appropriate one of a plurality of types of vibration requests.

It should be noted that, after the vibration device 20 is connected to the information processing apparatus 10 and starts operating, the vibration control section 43 may generate a vibration by using one of predefined vibration commands in a state before receiving the switching command from the information processing apparatus 10. In this case, using the non-host model vibration command by default makes it possible to generate a vibration even in a case where the executed application program is incompatible with the host model vibration command. Further, if the vibration device 20 is connected to an information processing apparatus that is of a type different from that of the information processing apparatus 10 and that is not provided with the function of the switching command transmission section 34, the vibration device 20 is unable to receive the switching command. Even in such a case, using the non-host model vibration command by default makes it possible to exercise vibration control based on the non-host model vibration command transmitted from such a different type of information processing apparatus.

Further, in contrast to the foregoing description, the vibration control section 43 may exercise vibration control based on two types of vibration commands irrespective of the switching command. For example, the vibration control section 43 may produce a combined vibration by combining two vibration waveforms determined based on two types of vibration commands and control the vibration mechanism 21 so as to cause the vibration mechanism 21 to generate the combined vibration.

Moreover, in a case where one of two types of vibration commands includes only data representative of a vibration having an amplitude of zero (nonvibration), the vibration control section 43 may generate a vibration on the basis of the other type of vibration command. In a case where two types of vibration commands are transmitted, one of them may substantially represent nonvibration. In such a case, it is sufficient if the vibration control section 43 generates a vibration based on a vibration command including vibration data for actually causing the vibration mechanism 21 to generate a vibration.

The following describes a specific example where the vibration control section 43 exercises vibration control based on the non-host model vibration command. As mentioned earlier, the non-host model vibration command does not include waveform data for actually operating the vibration mechanism 21. Therefore, when exercising vibration control by using the non-host model vibration command, the vibration control section 43 produces a vibration waveform on the basis of the numerical value that is included in the non-host model vibration command and that represents the vibration intensity, and vibrates the vibration mechanism 21 according to the produced vibration waveform.

More specifically, the vibration control section 43 determines an amplitude of the vibration waveform, according to the vibration intensity specified by the vibration command. Further, the vibration control section 43 sets a frequency of vibration to a predetermined numerical value. The frequency of vibration may be determined based on the vibration characteristics of the vibration mechanism built in the conventional vibration device. Further, in a case where a plurality of vibration mechanisms having different vibration characteristics are built in the conventional vibration device, the vibration control section 43 produces a vibration waveform by using the value of a frequency that is predetermined in association with a vibration mechanism specified by the vibration command. The vibration control section 43 produces waveform data for vibrating the vibration mechanism 21 at an amplitude and frequency determined as described above. It should be noted that the vibration waveform may be the shape of a sine wave or other waves prepared in advance based on the vibration characteristics of the conventional vibration device. It is also assumed that the vibration control section 43 operates one of a plurality of vibration mechanisms 21 built in the vibration device 20 that is associated with a vibration mechanism specified by the vibration command.

Figure 3:
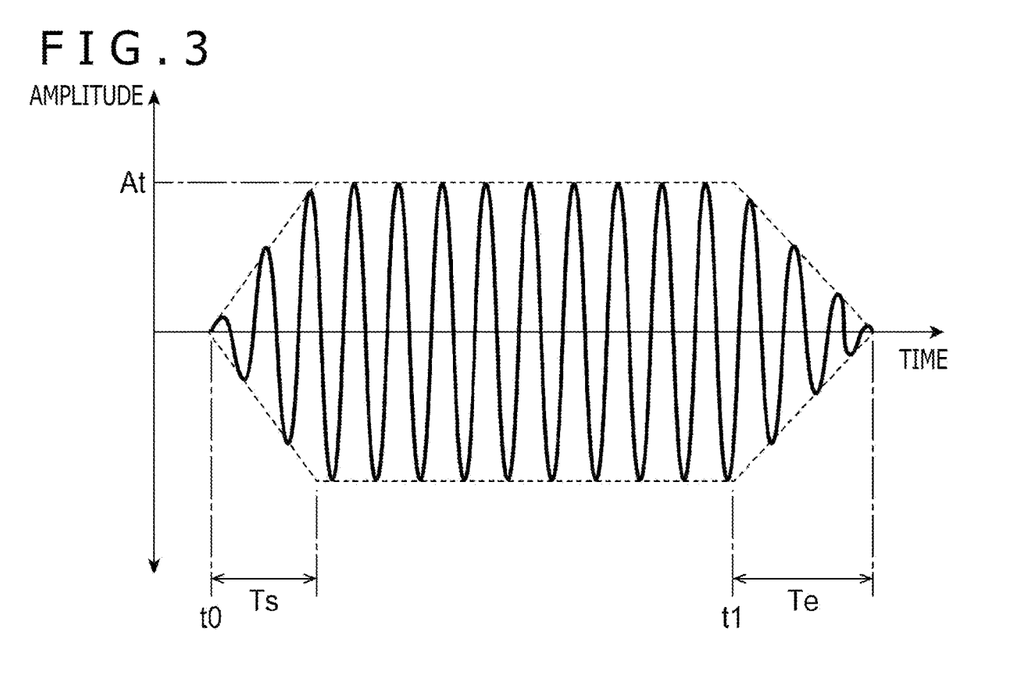
FIG. 3 is a diagram illustrating an example of a vibration waveform generated by a vibration device.

Further, in order to reproduce the vibration characteristics of the conventional vibration device, the vibration control section 43 may produce a vibration waveform whose amplitude varies with time. FIG. 3 depicts an example of such a vibration waveform. In the example depicted in FIG. 3, a target amplitude At is an amplitude that is determined based on the vibration intensity specified by the vibration command. In a case where the non-host model vibration command specifying the intensity of a vibration is received, the vibration control section 43 immediately starts generating the vibration (at time t0). However, at the beginning of vibration, the vibration control section 43 does not operate the vibration mechanism 21 at the target amplitude At corresponding to the specified intensity. Instead, the vibration control section 43 gradually increases the amplitude to the target amplitude At during a predetermined rise time Ts from the beginning of vibration. Subsequently, upon newly receiving the non-host model vibration command specifying an intensity of zero, the vibration control section 43 exercises control (at time t1 in the present example) so as to stop the generation of the vibration. In this case, too, the vibration control section 43 gradually decreases the amplitude to zero during a predetermined fall time Te instead of immediately stopping the vibration at time t1.

Control is exercised in the above-described manner to present the user with a vibration that is similar in sensation to the vibration presented by the conventional vibration device to the user, considering that response characteristics of the vibration generated by the conventional vibration device are lower than those of the vibration device 20. More specifically, based on the characteristics of the conventional vibration device, the vibration control section 43 pre-stores information regarding the rise time Ts and the fall time Te required for the generation of the vibration and references the pre-stored information to reproduce the vibration of the conventional vibration device.

It should be noted that, in a case where the switching command for instructing switch to the host model vibration command is received in the present example while a vibration based on the non-host model vibration command is generated, the vibration control section 43 may immediately stop the vibration based on the non-host model vibration command irrespective of the fall time Te and start exercising vibration control based on the host model vibration command. An alternative is to stop the vibration based on the non-host model vibration command as usual by gradually decreasing the amplitude during the fall time Te from a time point at which the switching command is received. In this case, the vibration control section 43 starts the vibration based on the host model vibration command after the vibration based on the non-host model vibration command is ended subsequently to the elapse of the fall time Te since the receipt of the switching command. In this instance, the vibration control section 43 skips a beginning portion of waveform data specified by the host model vibration command, the beginning portion corresponding to the fall time Te, and starts exercising vibration control based on the remaining portion of the waveform data. This results in neglecting the vibration during a period overlapping with the period specified by a different vibration command, but makes it possible to generate a vibration at time points specified by the application program during the non-overlapping period.

Further, in order to present the user with a vibration that is similar in sensation to the vibration generated by the conventional vibration device, the vibration control section 43 may vary the vibration mechanism 21 for generating a vibration on the basis of the non-host model vibration command or increase the number of units of the vibration mechanism 21 for generating a vibration. The foregoing examples assume that the host model vibration command and the non-host model vibration command both include information specifying which of two different vibration mechanisms generates a vibration, and that the vibration control section 43 vibrates the vibration mechanism 21R or 21L according to the included information. However, even when, for example, one of the vibration mechanisms is vibrated, the conventional vibration device may wholly vibrate depending on the structure of the conventional vibration device and the characteristics of the vibration mechanism built in the conventional vibration device. In such a case, based on the non-host model vibration command for generating a vibration for one vibration mechanism built in the conventional vibration device, the vibration control section 43 may vibrate both of the vibration mechanisms 21R and 21L in a predetermined ratio and phase. Simultaneously vibrating a plurality of vibration mechanisms 21 in the above manner makes it possible to generate a vibration for a large area of the vibration device 20 as compared to a case where only one vibration mechanism 21 is vibrated, and thus present the user with a vibration similar to the vibration generated by the conventional vibration device. Moreover, even in a case where the conventional vibration device and the vibration device 20 differ in the number and positions of built-in vibration mechanisms in the first place, the vibration control section 43 may determine, for example, the vibration mechanisms for generating a vibration on the basis of the non-host model vibration command, the ratio of vibration intensity between the vibration mechanisms, and the vibration phases of the vibration mechanisms, according to a predetermined correspondence.

The vibration control system 1 according to the present embodiment, which has been described above, is able to make the vibration device 20 applicable not only to an application program designed for use in the vibration device 20, but also to an application program applicable to the conventional vibration device only, and thus ensure compatibility with the conventional vibration device. Further, even in a case where a plurality of types of application programs are selectively executed as mentioned above, the vibration control system 1 is capable of handling vibration requests from the application programs without delay. Furthermore, the vibration device 20 according to the present embodiment is connectable not only to the information processing apparatus 10 compatible with the vibration device 20, but also to a different type of information processing apparatus to which the conventional vibration device is presumably connected, and is able to emulate the operation of the conventional vibration device on the basis of the non-host model vibration command transmitted from such a different type of information processing apparatus.

It should be noted that the present invention is not limited to the above-described embodiment. For example, the foregoing description assumes that the vibration device 20 includes two vibration mechanisms 21. However, the vibration device 20 may alternatively include only one vibration mechanism 21 or three or more vibration mechanisms 21. Further, the methods adopted by the vibration mechanisms included in the vibration device 20 and the conventional vibration device and the contents and format of data included in control commands for the devices are not limited to those described above and may be of various types.

REFERENCE SIGNS LIST

1: Vibration control system
10: Information processing apparatus
11: Control section
12: Storage section
13: Interface section
14: Display apparatus
20: Vibration device
21L, 21R: Vibration mechanism
22: Communication interface
23: Control circuit
31: Application execution section
32: Host model vibration command transmission section
33: Non-host model vibration command transmission section
34: Switching command transmission section
41: Host model vibration command reception section
42: Non-host model vibration command reception section
43: Vibration control section

The invention claimed is:

1. A hand-held game controlling device that is connectable to an information processing apparatus configured to play a video game, the hand-held game controlling device comprising:
a vibration mechanism configured to generate a plurality of vibrations,
wherein the vibration mechanism comprises two vibrators; and
processing circuitry configured to:
simultaneously receive, from the information processing apparatus, a first vibration command for a first type of vibration for the video game and a second vibration command for a second type of vibration for the video game different from the first type of vibration for the video game;
while simultaneously receiving the first and second vibration command, determine whether a switching command has been received from the information processing apparatus for the video game,
wherein the switching command is a command to switch between one of a predetermined set of vibration modes for the vibration mechanism, the predetermined set of vibration modes comprising (a) a first mode for operating the vibration mechanism based only on the first vibration command, (b) a second mode for operating the vibration mechanism based only on the second vibration command, and (c) a third mode for operating the vibration mechanism based on both of the first vibration command and the second vibration command simultaneously, the third mode being a combined vibration mode; and
upon determining that the switching command has been received, operate the vibration mechanism in accordance with the received switching command, and
upon determining that no switching command is received from the information processing apparatus, operate the vibration mechanism based only on the second type of vibration for the video game, wherein
the first vibration command comprises vibration waveform data specifying a vibration waveform shape used in the first type of vibration, and
the second vibration command consists of a numeric value specifying a vibration intensity used in the second type of vibration.

2. The hand-held game controlling device according to claim 1, wherein the processing circuitry is further configured to operate the vibration mechanism based on the second vibration command in accordance with a predetermined vibration amplitude profile.

3. The hand-held game controlling device according to claim 2, wherein the predetermined vibration amplitude profile comprises at least one of a predetermined amplitude rise period or a predetermined amplitude fall period.

4. The hand-held game controlling device according to claim 1, wherein the first vibration command comprises vibrator-specific commands for the two vibrators of the vibration mechanism, and the processing circuitry is configured to separately operate the two vibrators in accordance with the vibrator-specific commands.

5. An information processing apparatus configured to play a video game and comprising:
a connector configured to connect the information processing apparatus to a hand-held game controlling device having a vibration mechanism configured to generate a plurality of vibrations and comprising two vibrators; and processing circuitry configured to:

simultaneously transmit, to the hand-held game controlling device, a first vibration command for a first type of vibration for the video game and a second vibration command for a second type of vibration for the video game different from the first type of vibration for the video game, wherein the first vibration command comprises vibration waveform data specifying a vibration waveform shape used in the first type of vibration, and the second vibration command consists of a numeric value specifying a vibration intensity used in the second type of vibration; and while simultaneously transmitting the first and second vibration command, transmit a switching command to the hand-held game controlling device, the switching command comprising a command for the hand-held game controlling device to switch between one of a predetermined set of vibration modes for the vibration mechanism, the predetermined set of vibration modes comprising (a) a first mode for operating the vibration mechanism based only on the first vibration command, (b) a second mode for operating the vibration mechanism based only on the second vibration command, and (c) a third mode for operating the vibration mechanism based on both of the first vibration command and the second vibration command simultaneously, the third mode being a combined vibration mode, and upon determining that the switching command has been received from the information processing apparatus, the hand-held game controlling device operates the vibration mechanism in accordance with the received switching command, and upon determining that no switching command is received from the information processing apparatus, the hand-held game controlling device operates the vibration mechanism based only on the second type of vibration for the video game.

6. The information processing apparatus according to claim 5, wherein the processing circuitry is further configured to:

operate an application program that generates an application program specific vibration request, the application program specific vibration request corresponding to one of the first command or the second command or the third command; and generate the switching command based on the application program specific vibration request.

7. The information processing apparatus according to claim 5, wherein the first vibration command comprises vibrator-specific commands for the two vibrators of the hand-held game controlling device.

8. An information processing method that is executable by a computer configured to play a video game and that is connectable to a hand-held game controlling device that includes a vibration mechanism that includes two vibrators, the information processing method comprising:

simultaneously transmitting, to the hand-held game controlling device, a first vibration command for a first type of vibration for the video game and a second vibration command for a second type of vibration for the video game different from the first type of vibration for the video game, wherein the first vibration command comprises vibration waveform data specifying a vibration waveform shape used in the first type of vibration, and the second vibration command consists of a numeric value specifying a vibration intensity used in the second type of vibration; and while simultaneously transmitting the first and second vibration command, transmitting a switching command to the hand-held game controlling device, the switching command comprising a command for the hand-held game controlling device to switch between one of a predetermined set of vibration modes for the vibration mechanism, the predetermined set of vibration modes comprising (a) a first mode for operating the vibration mechanism based only on the first vibration command, (b) a second mode for operating the vibration mechanism based only on the second vibration command, and (c) a third mode for operating the vibration mechanism based on both of the first vibration command and the second vibration command simultaneously, the third mode being a combined vibration mode, and upon determining that the switching command has been received from the information processing apparatus, the hand-held game controlling device operates the vibration mechanism in accordance with the received switching command, and upon determining that no switching command is received from the information processing apparatus, the hand-held game controlling device operates the vibration mechanism based only on the second type of vibration for the video game.

9. A non-transitory computer product containing a program for controlling a computer configured to play a video game and that is connectable to a hand-held game controlling device that includes a vibration mechanism that includes two vibrators to perform a method, the method comprising:

simultaneously transmitting, to the hand-held game controlling device, a first vibration command for a first type of vibration for the video game and a second vibration command for a second type of vibration for the video game different from the first type of vibration for the video game, wherein the first vibration command comprises vibration waveform data specifying a vibration waveform shape used in the first type of vibration, and the second vibration command consists of a numeric value specifying a vibration intensity used in the second type of vibration; and while simultaneously transmitting the first and second vibration command, transmitting a switching command to the hand-held game controlling device, the switching command comprising a command for the hand-held game controlling device to switch between one of a predetermined set of vibration modes for the vibration mechanism, the predetermined set of vibration modes comprising (a) a first mode for operating the vibration mechanism based only on the first vibration command, (b) a second mode for operating the vibration mechanism based only on the second vibration command, and (c) a third mode for operating the vibration mechanism based on both of the first vibration command and the second vibration command simultaneously, the third mode being a combined vibration mode, and upon determining that the switching command has been received from the information processing apparatus, the hand-held game controlling device operates the vibration mechanism in accordance with the received switching command, and upon determining that no switching command is received from the information processing apparatus, the hand-held game controlling device operates the vibration mechanism based only on the second type of vibration for the video game.

10. A method of controlling a hand-held game controlling device that is connectable to an information processing apparatus configured to play a video game, the hand-held game controlling device including a vibration mechanism configured to generate a plurality of vibrations, wherein the vibration mechanism comprises two vibrators, the method comprising:

simultaneously receiving, from the information processing apparatus, a first vibration command for a first type of vibration for the video game and a second vibration command for a second type of vibration for the video game different from the first type of vibration for the video game;

while simultaneously receiving the first and second vibration command, determining whether a switching command has been received from the information processing apparatus to for the video game, wherein the switching command is a command to switch between one of a predetermined set of vibration modes for the vibration mechanism, the predetermined set of vibration modes comprising (a) a first mode for operating the vibration mechanism based only on the first vibration command, (b) a second mode for operating the vibration mechanism based only on the second vibration command, and (c) a third mode for operating the vibration mechanism based on both of the first vibration command and the second vibration command simultaneously, the third mode being a combined vibration mode; and upon determining that the switching command has been received, operating the vibration mechanism in accordance with the received switching command, and upon determining that no switching command is received from the information processing apparatus, operate the vibration mechanism based only on the second type of vibration for the video game, wherein the first vibration command comprises vibration waveform data specifying a vibration waveform shape used in the first type of vibration, and the second vibration command consists of a numeric value specifying a vibration intensity used in the second type of vibration.

* * * * *